United States Patent
Okabayashi et al.

(10) Patent No.: US 8,074,046 B2
(45) Date of Patent: Dec. 6, 2011

(54) SEMICONDUCTOR MEMORY DEVICE AND OPERATION METHOD THEREOF

(75) Inventors: Hiroko Okabayashi, Tachikawa (JP); Tetsuya Kaise, Hino (JP); Katsushi Naito, Yokohama (JP); Takashi Ogo, Uto (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 611 days.

(21) Appl. No.: 12/198,487

(22) Filed: Aug. 26, 2008

(65) Prior Publication Data
US 2009/0063593 A1    Mar. 5, 2009

(30) Foreign Application Priority Data
Aug. 29, 2007    (JP) ................ P2007-222489

(51) Int. Cl.
*G06F 9/26*    (2006.01)
(52) U.S. Cl. ..................................... 711/203
(58) Field of Classification Search .............. None
See application file for complete search history.

(56) References Cited

U.S. PATENT DOCUMENTS
| | | | |
|---|---|---|---|
| 6,101,587 A | 8/2000 | Kim | |
| 2005/0036372 A1* | 2/2005 | Sasaki | 365/202 |
| 2006/0047889 A1* | 3/2006 | Sasaki et al. | 711/103 |
| 2008/0005531 A1* | 1/2008 | Praca | 711/209 |

FOREIGN PATENT DOCUMENTS
| | | |
|---|---|---|
| JP | 11-154395 | 6/1999 |
| JP | 2004-152440 | 5/2004 |

* cited by examiner

*Primary Examiner* — Duc Doan
(74) *Attorney, Agent, or Firm* — Oblon, Spivak, McClelland, Maier & Neustadt, L.L.P.

(57) ABSTRACT

A semiconductor memory device comprises an input unit inputting an address and data; a storage unit storing data and a FAT; an address conversion unit converting the address; an access unit accessing the storage unit according to the converted address; a detection unit detecting a format of the FAT; and an alteration unit altering conversion rules in the address conversion unit according to the detection.

19 Claims, 11 Drawing Sheets

| Comparison address | Comparison result |
|---|---|
| Head address | Matching |
| Head address +1 | Matching |
| Head address +2 | Mismatching |
| ... | ... |
| Final address | Mismatching |

SEMICONDUCTOR MEMORY DEVICE AND OPERATION METHOD THEREOF

CROSS REFERENCE TO RELATED APPLICATIONS

This application is based upon and claims the benefit of priority from the prior Japanese Patent Application No. 2007-222489, filed on Aug. 29, 2007; the entire contents of which are incorporated herein by reference.

BACKGROUND OF THE INVENTION

1. Field of the Invention

The present invention relates to a semiconductor memory device and an operation method thereof.

2. Description of the Related Art

Various devices have become compatible with the memory card in these years. For example, the memory card is used for cellular phones to store camera-taken images, music, and video, backup of built-in memory, and the like. And, the memory card is being made to have a larger capacity. An 32-GB memory card having a capacity larger than that of DVD is already on the market, and the memory card is being advanced to have larger capacities. The large-capacity memory card stores various kinds of user data (for example, personally shot image data, copyright-protected music and video data, and personal information).

Formatting is generally used to erase all user data in the memory card. The formatting includes full formatting and quick formatting. The full formatting erases the whole user data in the memory card. Meanwhile, the quick formatting erases data of an area (for example, FAT1 area) managing the file system of the user data to disable the access to the user data. As a result, there is provided the same effect as the erase of the user data itself.

Since the full formatting of a large capacity memory card requires a considerable time, the quick formatting is usually used, and the users also often select the quick formatting. And, there is also a host device which is compatible with quick formatting only.

According to the quick formatting, the user data can be read because the user data itself is remained in the memory card. For example, there is commercially available software which restores the erased data if data in the memory card is accidentally erased.

SSD (Solid State Drive), in which a hard disc is replaced with NAND type flash memories, has been developing as new memory devices.

In order to prevent data that is recorded on a recording medium from unwanted outflow, there is disclosed a technology of recording data by encrypting the data, performing address conversion of a designated address, and recording the data by using the converted address (JP-A No. 2004-152440).

Even if the data is encrypted, however, the data might be decoded by analyzing the encrypted data if the data could be fetched as it was.

BRIEF SUMMARY OF THE INVENTION

According to an aspect of the present invention, there is provided a semiconductor memory device that data recorded before formatting is prevented from being read after the formatting and an operation method thereof.

According to an aspect of the present invention, there is provided a semiconductor memory device, comprising an input unit inputting an address and data; a storage unit storing data and a FAT; an address conversion unit converting the address; an access unit accessing the storage unit according to the converted address; a detection unit detecting a format of the FAT; and an alteration unit altering conversion rules in the address conversion unit according to the detection.

According to an aspect of the present invention, there is provided an operation method of a semiconductor memory device which has a storage unit storing data and a FAT, and an address conversion unit converting an address, comprising inputting an address and data; detecting the presence or not of a format of the FAT; altering conversion rules in the address conversion unit according to the detection; converting the address inputted by the address conversion unit; and accessing the storage unit according to the converted address.

DETAILED DESCRIPTION OF THE INVENTION

Embodiments of the present invention are described below in detail with reference to the drawings.

First Embodiment

Figure 1:
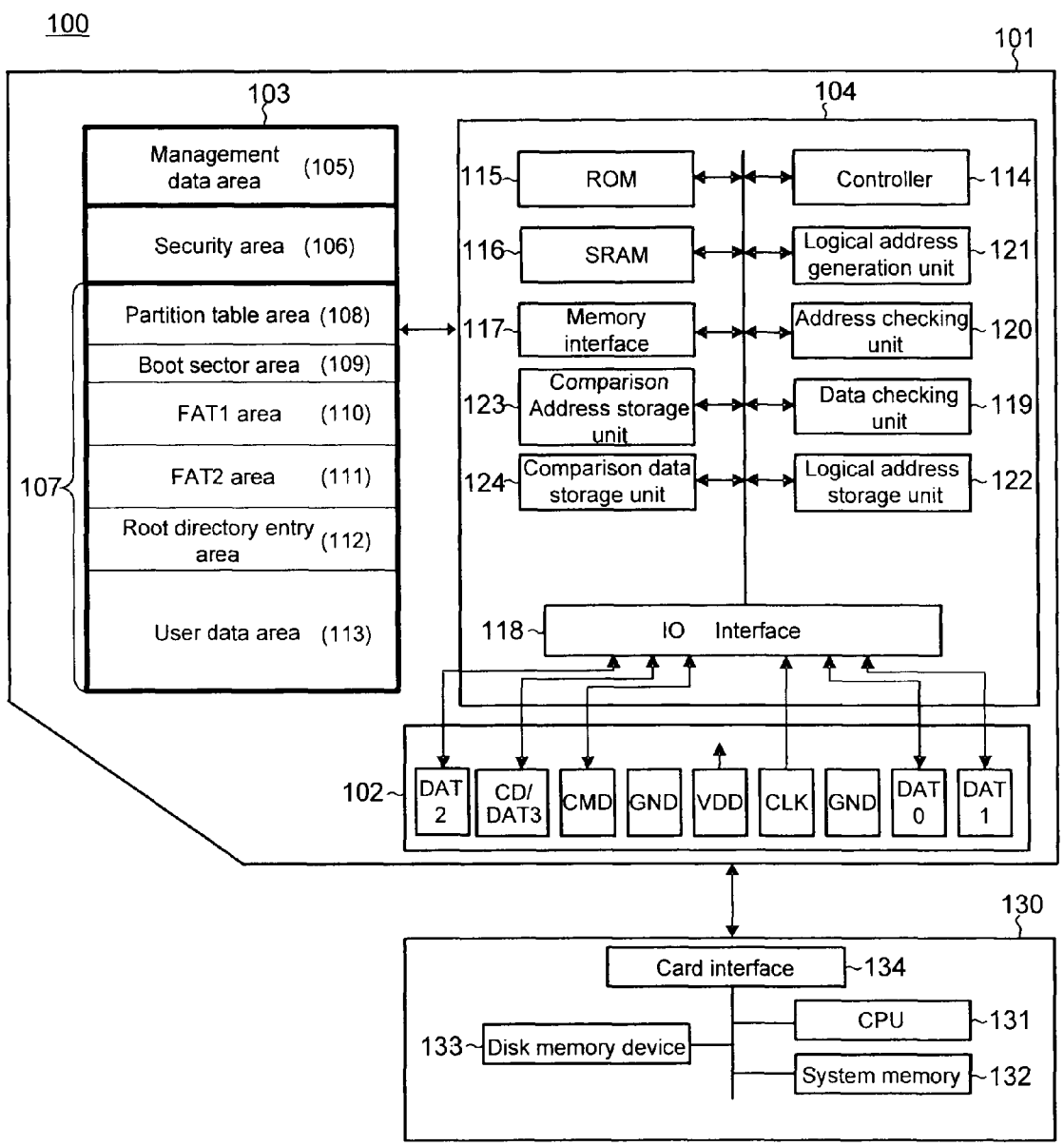
FIG. 1 is a block diagram showing a memory system according to a first embodiment.

FIG. 1 is a block diagram showing a memory system 100 according to a first embodiment of the present invention. The memory system 100 has a semiconductor memory card 101 (hereinafter, abbreviated as a memory card) and a host device 130.

The memory card 101 has an interface signal terminal unit 102, a NAND memory 103, and a processor module 104.

The interface signal terminal unit 102 is arranged in the memory card 101 and has nine signal terminals, namely, a clock terminal CLK, a command terminal CMD, data terminals DAT0 to DAT3, a power source terminal VDD and two ground terminals GND. The command terminal CMD is a terminal for transfer of a command and for transfer of a response to the command. The interface signal terminal unit 102 functions as an input unit input of an address.

The NAND memory 103 is a nonvolatile memory for storing data and functions as a storage unit storage of data. The storage area of the NAND memory 103 is divided into a management data area 105, a security area 106, and a user area 107.

The management data area 105 is an area for storage of information (e.g., security information of the memory card 101 and card information of media ID and the like) mainly related to the memory card 101. For example, the media ID is 64-bit data allotted to each memory card 101 in order to identify the memory card 101.

The security area 106 is an area for storage of confidential data and becomes possible to access only when the validity of the host device 130 is proved by card identification processing between the memory card 101 and the host device 130.

The user area 107 is an area used by the user to store user data (for example, image data or music data). The user area 107 is accessed in a sector unit. In other words, the sector is a minimum unit that the host device 130 can access the memory card 101. When the memory card 101 is an SD memory card, 1 sector is 512 bytes.

The user area 107 is divided into a partition table area 108, a boot sector area 109, a FAT1 (file allocation table 1) area 110, a FAT2 area 111, a root directory entry area 112, and a user data area 113. This division corresponds to the use of the FAT file system because the data is handled as a file in the user area 107.

The partition table area 108 stores information such as the number of a start sector of each partition of a logical disk.

The boot sector area 109 stores information such as the number of sectors configuring one cluster which is a parameter of the logical disk, the number of bytes configuring one sector, and the like.

The FAT1 area 110 stores information on the order (hereinafter called as a cluster chain) of clusters configuring data.

The FAT2 area 111 stores the same data as the FAT1 area 110 for backup in case of breakage of the FAT1 area 110.

The root directory entry area 112 stores directory entry information of the root directory. The directory entry information is, for example, 32-byte data including a file name, a file extension, a file size, a start cluster number and the like.

The user data area 113 stores user data.

In a case where the memory card 101 is subjected to quick formatting, the FAT1 area 110, the FAT2 area 111, and the root directory entry area 112 are generally restored to the initial state. For example, the values of the FAT1 area 110 and the FAT2 area 111 are assumed to be an initial value, and all data in the root directory entry area 112 is rewritten to "0". In some cases, the root directory entry area 112 is not initialized. The directory entry information is deleted by writing directory entry deleting marks. For example, specific data are written in file names of the directory entry information as directory entry deleting marks. In other words, at the time of formatting, particular data is written into a particular area (particular address) of the user area 107. Formatting of the memory card 101 can be detected by detecting the writing of the particular data to the particular address as described later.

The processor module 104 is comprised of a controller 114, a ROM 115, an SRAM 116, a memory interface 117, an IO interface 118, a data checking unit 119, an address checking unit 120, a logical address generation unit 121, a logical address storage unit 122, a comparison address storage unit 123, and a comparison data storage unit 124.

The controller 114 functions as a main control unit of the memory card 101 and performs the following processing.

Detection of format (The controller 114 functions as a detection unit detecting the format of the storage unit. For detection, the data checking unit 119, the address checking unit 120, the logical address storage unit 122, and the comparison address storage unit 123 are used.)

Conversion of address conversion rules (The controller 114 functions as an alteration unit altering the conversion rules in the address conversion unit. The conversion rules are altered by alteration of a value stored in the logical address storage unit 122.)

The ROM (Read Only Memory) 115 stores a control program for controlling the controller 114.

The SRAM (Static Random Access Memory) 116 is used as a work/buffer memory by the controller 114.

The memory interface 117 writes and reads data into and from the NAND memory 103. In other words, the memory interface 117 functions as an access unit accessing the storage unit.

The IO interface 118 is connected to the interface signal terminal unit 102 and mediates the data exchange between the memory card 101 and the host device 130.

The logical address generation unit 121 converts the address input when the read command or the write command is received and generates a logical address value to make reading/writing of data. In other words, the logical address generation unit 121 functions as an address conversion unit converting the address. For the conversion, a value stored in the logical address storage unit 122 is used. Details will be described later.

The logical address storage unit 122 stores data (address conversion rules) for generation of a logical address, for example, the number of bits which is exchanged by the logical address generation unit 121. This data (address conversion rules) is altered when the format is detected (when matching is confirmed by both the address checking unit 120 and the data checking unit 119). Details are described later.

The comparison address storage unit 123, the comparison data storage unit 124, the address checking unit 120 and the data checking unit 119 can be used to detect writing of particular data into a particular address, namely, format processing.

The address checking unit 120 checks whether or not, for example, a 32-bit address value, which is set by the argument of read/write command, matches an address value stored in the comparison address storage unit 123.

The data checking unit 119 checks whether or not data to be written according to a write command matches data stored in the comparison data storage unit 124.

The comparison address storage unit 123 stores a particular address value (for example, a head address of the FAT1 area 110). This address value is set by a manufacturer of the memory card 101.

The comparison data storage unit 124 stores particular continuous data (for example, an initial value (for example, a value of all zero for 512 bytes) for one sector of the FAT1 area 110). The continuous data is set by the manufacturer of the memory card 101. The continuous data is determined as one sector, because it is corresponded with the minimum unit accessible to the memory card 101. But, the data amount of the continuous data may be smaller or larger than one sector.

The host device 130 is a digital device such as a personal computer, and has a card interface 134, a CPU 131, a system memory 132, and a disk memory device 133. The card interface 134 is an interface that the memory card 101 can be attached. The CPU (Central Processing Unit) 131 serves as the control center of the host device 130. The system memory 132 is comprised of a RAM or the like and used by the CPU 131.

(Details of Address Conversion)

Figure 2:
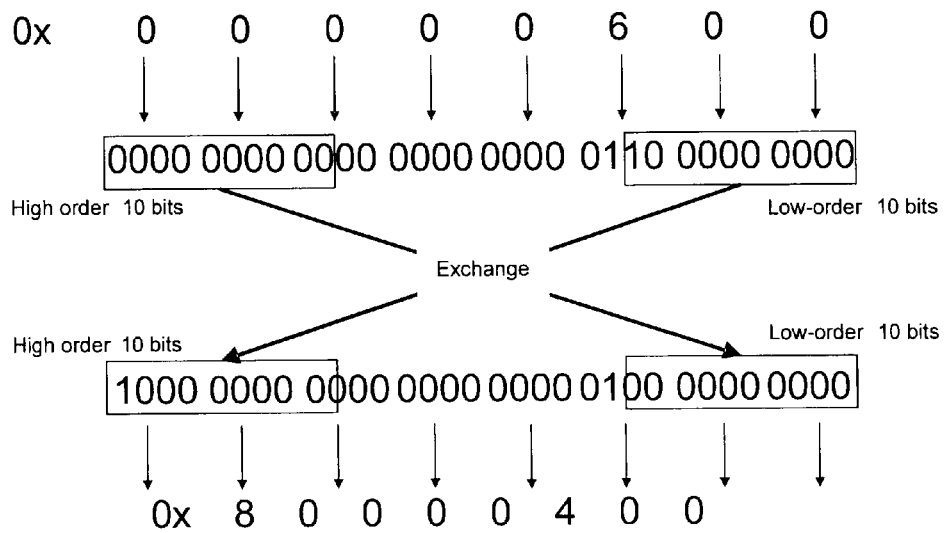
FIG. 2 is a schematic view showing an example of address conversion in a logical address generation unit.

Address value generation (address conversion) by the logical address generation unit 121 is described in detail. FIG. 2 shows an example of the address conversion by the logical address generation unit 121. A logical address is generated by exchanging a high-order bit (a first bit sequence) and a low-order bit (a second bit sequence) of the address to be inputted. At this time, a bit number (a bit sequence to be exchanged) of the high-order bit and the low-order bit is defined by the value stored in the logical address storage unit 122.

In this example, address "0x0000_0600" is inputted to the logical address generation unit 121 to determine a bit number to be exchanged to be 10. High-order 10 bit "0000000000" and low-order 10 bit "1000000000" of the input address are exchanged. As a result, logical address "0x8000_0400" with high-order 10 bit "1000000000" and low-order 10 bit "0000000000" is generated. Here, a 32-bit address value is shown as "0x high-order 16 bit_low-order 16 bit" by hexadecimal number. Symbol "0x" indicates a hexadecimal form. And, symbol "_" indicates a separator for 16 bits.

Figure 3:
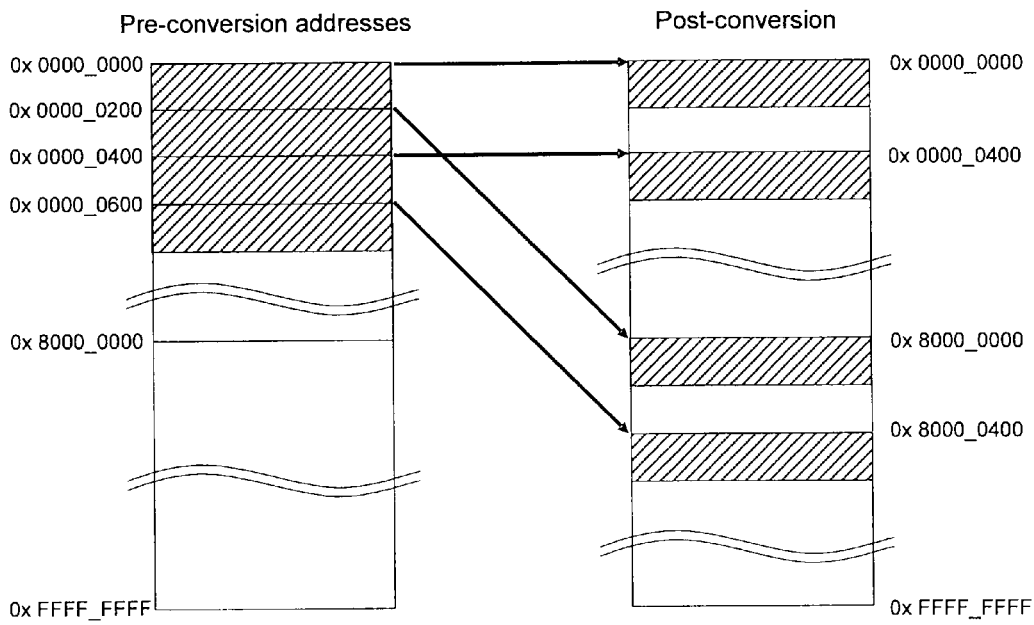
FIG. 3 is a diagram showing an example of a correspondence relationship between pre-conversion addresses and post-conversion addresses.

FIG. 3 is a diagram showing an example of a correspondence relationship between a pre-conversion address and a post-conversion address. The pre-conversion address is an address that the user accesses, namely an appearance address (external address) from the outside of the memory card 101. The post-conversion address is an address to be accessed within the user area 107, namely a real address (internal address) within the memory card 101.

It is assumed in FIG. 3 that data is written into four continuous areas within the user area 107. In this case, a write command is issued with head addresses ("0x0000_0000", "0x0000_0200", "0x0000_0400", and "0x0000_0600") of these areas determined as arguments. These head addresses are subjected to address conversion to determine internal addresses. Here, it is assumed that the bit number to be exchanged is 10 and converted to head addresses "0x0000_0000", "0x8000_0000", "0x0000_0400", and "0x8000_0400". Thus, the address conversion results in a dispersed arrangement of data which was originally continuous.

(Details of Alteration of Address Conversion Rules)

As described above, when a format is detected, the value (bit number to be exchanged) to be stored in the logical address storage unit 122 is altered. For example, every time a format is detected, the value of the bit number to be stored in the logical address storage unit 122 is altered sequentially as follows.

"0"→"10"→"11"→"12"→"13"→"14"→"15"→"16"→"0"→ . . . (continue)

In this example, 1 is basically added (+1) to the current stored value.

In this example, "1" to "9" are not used as the value of the bit number. It is because the altered address is related to the head address of the individual sectors of the NAND memory 103. In this embodiment, the address is allotted to every byte of the data of the NAND memory 103, while a data read/write unit is determined to be one sector (512 byte). At this time, low-order 9 bits of the address are not used for identification of sectors. Bits from the low order to the 10th and later of the address are used for identification of a sector (210 512).

When 1 is added to the value "16", alteration to value "0" is made. It is because the address of this case is 32 bits, and the ranges of upper and lower bits to be exchanged are determined not to overlap with each other.

When the bit number to be exchanged is altered to "11" in the example of FIG. 2 and address "0x0000_0600" is inputted, high-order 11 bits "00000000000" and low-order 11 bits "11000000000" are exchanged. As a result, there is generated a logical address "0xC000_0000" with high-order 11 bits "11000000000" and low-order 11 bits "00000000000".

(Operation of Memory System 100)

An operation procedure of the host device 130 to access (to write or read data) the user area 107 in the memory card 101 is described.

A. Reading Data from Memory Card 101

A case that the host device 130 of this embodiment reads data from the user area 107 in the memory card 101 is described with reference to the flow chart of FIG. 4.

(1) Identification Processing of Memory Card 101 (Step S11)

When card identification processing is performed between the memory card 101 and the host device 130, the memory card 101 falls in an accessible state. For example, the card identification processing is started in the following cases.

Memory card 101 is inserted into the card interface 134 of the host device 130 to which power is applied.

Power is applied to the host device 130 to which the memory card 101 is fitted.

(2) Transmission/Reception of Reading (Read) Command (Step S12)

The host device 130 sets an address, for example, "0x0000_0600" for the argument of the read command and transmits it to the memory card 101, and the memory card 101 receives the read command. It is to read data for one sector from the address "0x0000_0600", of the user area 107 of the memory card 101. Generally, it is possible to access (data reading) the FAT1 area 110, the FAT2 area 111, the root directory entry area 112 and the user data area 113 by the read command (and a write command described later).

(3) Conversion of Read Address (Step S13)

The logical address generation unit 121 performs address conversion of the address transmitted as the argument of the read command and generates a logical address of the user area 107. For example, the transmitted address is caused to generate a logical address by exchanging the high-order bit and the low-order bit for a bit number which are stored in the logical address storage unit 122. When it is assumed that the bit number to be exchanged is "10", the generated logical address becomes "0x8000_0400".

(4) Reading/Transmission/Reception of Data from the User Area 107 (Steps S14, S15)

Data for one sector at the generated logical address on the user area 107 is read and transmitted as response data to the host device 130. The host device 130 receives the response data from the memory card 101.

B. Writing Data to Memory Card 101

Figure 5:
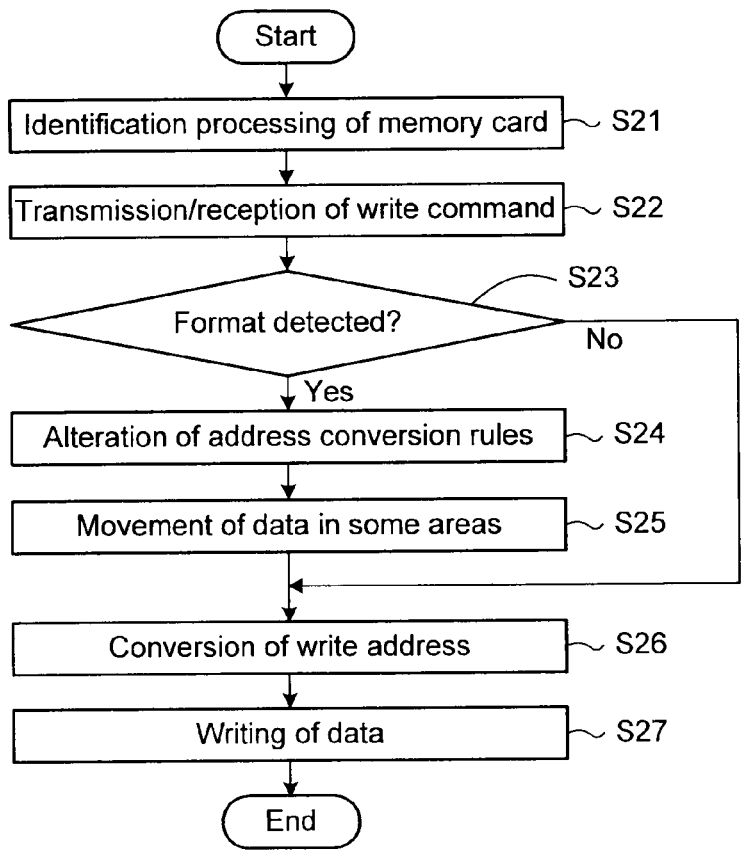
FIG. 5 is a flow chart showing an example of a procedure of writing data into a memory card.

A case that data is written in the user area 107 within the memory card 101 of the present embodiment is described with reference to the flow chart of FIG. 5.

(1) Identification Processing of Memory Card 101 (Step S21)

Description of the identification processing of the memory card 101 is omitted because it is the same as the case of reading.

(2) Transmission/Reception of Writing (Write) Command (Step S22)

The host device 130 sets an address, for example, "0x0000_0600" for the argument of the write command and transmits it to the memory card 101, and the memory card 101 receives the write command. It is to write data for one sector at the address "0x0000_0600", of the user area 107 of the memory card 101.

(3) Detection of Format of Memory Card 101 (Step S23)

Format of the memory card 101 is detected. As described above, the format is detected by detecting the writing of particular data to a particular address.

1) The address checking unit 120 compares the address transmitted by the argument of the write command with the address value stored in the comparison address storage unit 123. If the addresses do not match, it is judged that the format is not detected.

2) If the address transmitted as the argument of the write command matches the address value stored in the comparison address storage unit 123 when compared by the address checking unit 120, the data checking unit compares the data transmitted by the write command with the data stored in the comparison data storage unit 124. If they do not match, it is judged that the format is not detected. In other words, it is judged that the format is detected if both the address and the data are matched.

(4) Alteration of Address Conversion Rules (Step S24)

If the format is detected, the address conversion rules are altered. In other words, data of the logical address storage unit 122 is altered. For example, 1 is added (+1) to the value "10" stored in the logical address storage unit 122 to alter to "11".

(5) Movement of Data in Parts of User Area 107 (Step S25)

The controller 114 moves on the user area 107 the data of an address value smaller than the address value stored in the comparison address storage unit 123. Basic information data of the partition table area 108 and the boot sector area 109 have been written in an address value smaller than the address value stored in the initial state in the comparison address storage unit 123. It is because the basic information data cannot be read if the address is not moved according to the conversion of the altered address rules. Based on the pre-conversion address (external address), a range that the data is moved is determined, and based on the altered rules, data is moved to the converted address. The movement range has the data arranged according to the converted address on the basis of the rules before the alteration.

For example, all data (data of the partition table area 108 and the boot sector area 109) written at addresses "0x0000_0000" to "0x0005_BFFF" are stored again into an address value newly generated by the logical address generation unit 121. But, the management data area 105 and the security area 106 may not be moved. These areas are prevented from being accessed, so that it is possible to prevent a leakage of information without performing the address conversion.

(6) Conversion of Write Address (Step S26)

High-order bit and low-order bit for the bit number stored in the logical address storage unit 122 are exchanged to generate the logical address of the user area 107.

In a case where the bit number stored in the logical address storage unit 122 is "10", the logical address to be generated becomes "0x8000_0400". Meanwhile, in a case where the bit number to be exchanged is altered to "11" upon the detection of the format, when address "0x0000_0600" is inputted, the logical address to be generated becomes "0xC000_0000". Thus, when the format is detected and the address conversion rules are altered, data before formatting cannot be read continuously even if a read command is issued.

(7) Writing of Data into User Area 107 (Step S27)

Data for one sector is written into the generated logical address on the user area 107.

Operation Example

An operation example of the memory system 100 is described. Here, it is assumed that the memory card 101 has a capacity of 1 GB, and the host device 130 is a personal computer (hereinafter abbreviated as PC).

The user inserts the memory card 101 into the PC in order to store 1 MB of image data. At this time, it is assumed that the memory card 101 is new and has no data written in it, and an initial value is stored in the entire user area 107. It is assumed that the comparison address storage unit 123 and the comparison data storage unit 124 store the head address "0x0005_C000" of the FAT1 area 110 and the initial value of the FAT1 area 110 for one sector. It is assumed that the logical address storage unit 122 stores a bit number "0".

A. Writing of Pre-Format Data

It is assumed that user data (for example, 1 MB of image data) is stored in the memory card 101. In this case, the PC issues write commands sequentially to write data in the FAT1 area 110, the FAT2 area 111, the root directory entry area 112 and the user data area 113.

(1) Writing of Data into FAT1 Area 110

Taking head address "0x0001_E800" of the FAT1 area 110 as an argument, a write command is issued to the memory card 101. The memory card 101 receives the write command.

The address checking unit 120 compares the address given as an argument with the address value stored in the comparison address storage unit 123. The given address matches the address of the comparison address storage unit 123. The data checking unit 119 compares the transmitted data (data to be written) with data of the comparison data storage unit 124. The data to be written does not match data of the comparison data storage unit 124. It is because the data to be written is 32 bytes of directory entry information having information such as an image data size and a file name of image data to be stored. As described above, the format is not detected because the data do not match.

The logical address generation unit 121 generates logical address value "0x0001_E800", that cluster chain information is written, from the value "0" of the logical address storage unit 122 and the address given as an argument. Here, since the address stored in the logical address storage unit 122 is "0", the bit number is not exchanged, and the same value as the given address value is generated. Since the size of one cluster of 1-GB memory card 101 is 16 KB and image data to be stored is 1 MB, clusters required for storing the image data are 64. When it is assumed that the file system of the memory card 101 is FAT 16, 128 bytes of data are written into the FAT1 area 110.

(2) Writing of Data into FAT2 Area 111

Taking head address "0x0003_D400" of the FAT2 area 111 as an argument, a write command is issued from the PC to the memory card 101. The memory card 101 receives the write command.

The address checking unit 120 compares the address given as an argument with the address value stored in the comparison address storage unit 123. Since the address given as an argument does not match the address of the comparison address storage unit 123, a format is not detected.

The logical address generation unit 121 generates logical address value "0x0003_D400" that cluster chain information is written. The same data as that of the FAT2 area 111 is written in the FAT2 area 111.

(3) Writing Data into Root Directory Entry Area 112

Taking the head address "0x0005_C000" of the root directory entry area 112 as an argument, a write command is issued from the PC to the memory card 101. The memory card 101 receives the write command.

The address checking unit 120 compares the address value given as an argument with the address value stored in the comparison address storage unit 123. Since the address given as an argument does not match the address of the comparison address storage unit 123, a format is not detected.

Logical address value "0x0005_C000" written directory entry information is generated, and 32 bytes of data are written into the root directory entry area 112.

(4) Writing Data into User Data Area 113

Taking address "0x0006_0600" of the user data area 113 as an argument, a write command is issued to the memory card 101. The memory card 101 receives a write command.

The address checking unit 120 compares the address given as an argument with the address value stored in the comparison address storage unit 123. Since the address given as an argument does not match the address stored in the comparison address storage unit, a format is not detected. Logical address "0x8006_0600" written image data is generated, and 1 MB of image data is written into the user data area 113.

B. Performing Formatting

Here, it is assumed that the memory card 101 to which 1 MB of image data is written is subjected to quick formatting. It is assumed that the FAT1 area 110 and the FAT2 area 111 are rewritten to an initial value by the quick formatting.

Taking address "0x0005_C000" of the FAT1 area 110 as an argument, the PC issues a write command to the memory card 101. The memory card 101 receives the write command.

The address checking unit 120 compares the address given as an argument with the address stored in the comparison address storage unit 123. Since the given address matches the stored address, the data transferred from the data checking unit 119 is compared with data stored in the comparison data storage unit 124. The data transferred from the PC is the initial value of the FAT1 area 110 and matches the stored data. As a result, a format is detected.

Since the format is detected, the controller 114 alters the data stored in the logical address storage unit 122 from "0" to "10". Based on the altered value, the address value "0x0005_C000" is generated, and an initial value for 512B is written to the address.

At this time, the controller 114 moves an address before the address value stored in the comparison address storage unit 123, namely data ranging from "0x0000_0000" to "0x0005_BFFF" in this embodiment. Here, the moved address is an address converted according to the altered rules. Namely, the high-order bit and the low-order bit of the data value "10" bits stored in the logical address storage unit 122 are exchanged to generate an address.

Subsequently, with the address converted according to the altered rules, data is written into the user data area 113.

For the remaining area of the FAT1 area 110 and also the FAT2 area 111, a write command is also issued, and the initial value is written into the address generated according to the altered value. Thus, since the initial value is written into the whole of the FAT1 area 110 and the FAT2 area 111, formatting of the memory card 101 is completed.

C. Reading Data after Formatting

It is assumed that data for 2 sectors is read from "0x0006_0000" of the user data area 113. In this case, address value "0x0006_0000" of a first sector becomes the same address of "0x0006_0000" when the high-order 10 bit and the low-order 10 bit are exchanged. And, when address value "0x0006_0200" of a second sector is exchanged, it becomes "0x8006_0000". As a result, the internal access area is segmented, causing a situation that the user cannot read correct data. In other words, even if a direct access is made to the user data area 113, meaningful data cannot be read. Thus, information is prevented from being leaked.

When quick formatting is performed at the time of formatting the memory card 101, only management information (such as data of the FAT1 area 110 and FAT2 area 111) of the user data is cleared, and the user data itself is remained in the user data area 113. Therefore, there is a possibility that user data is extracted by a third party of the like.

In this embodiment, data is stored at the converted address, and the formatting of the memory card 101 is detected, and the conversion rules are altered. Since the data conversion rules are different before and after the formatting, it is hard to access the data before formatting, and data leakage (improvement of secrecy of data) is prevented. In view of the conversion rules after formatting, it is preferable to discontinuously arrange data before formatting.

Second Embodiment

Figure 6:
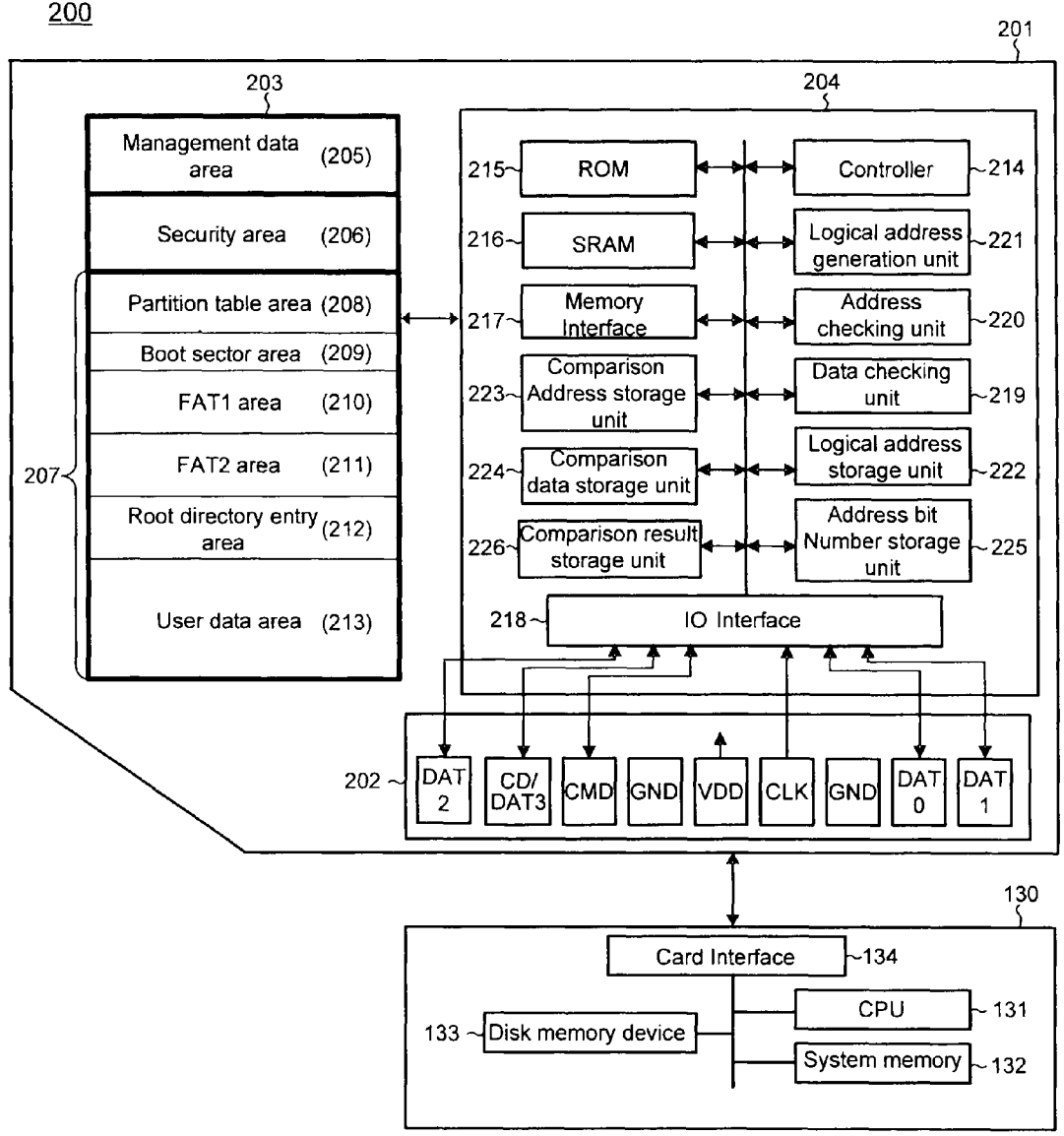
FIG. 6 is a block diagram showing a memory system according to a second embodiment.

FIG. 6 is a block diagram showing a memory system 200 according to a second embodiment. The memory system 200 has a memory card 201 and a host device 130. The memory card 201 has an interface signal terminal unit 202, a NAND memory 203, and a processor module 204.

The memory system 200 has a structure substantially corresponding to that of the memory system 100 according to the first embodiment. The memory system 200 is different from the memory system 100 on the following points (1) to (4).

(1) The address of the NAND memory 203 is managed in a sector unit. Meanwhile, the address of the NAND memory 103 for accessing the memory card 101 is managed in byte unit in the first embodiment.

(2) A comparison address storage unit 223 stores a prescribed range of address values (for example, the address value of the whole FAT1 area 110). Meanwhile, the comparison address storage unit 123 of the memory card 101 according to the first embodiment stores a single address value (for example, the head address value of the FAT1 area 110). In the present embodiment, the address value is provided with an increased range to improve certainty of detection of a format.

(3) An address bit number storage unit 225 is added into the processor module 204.

The address bit number storage unit 225 stores the bit number of the address used to access the memory card 201. The used bit number is different depending on the capacity of the NAND memory 203. For example, when the capacity of the NAND memory 203 is 8 GB, value "23" is stored as a bit number in the address bit number storage unit 225. This value is generally stored at the time of shipping of the memory card 201.

(4) A comparison result storage unit 226 is added into the processor module 204.

The comparison result storage unit 226 stores the comparison result for each sector in an address checking unit 220 and a data checking unit 219. It is to cope with a case that the whole of the comparison range to be stored in the comparison address storage unit 223 is not written by one write command.

Figures 7, 8:
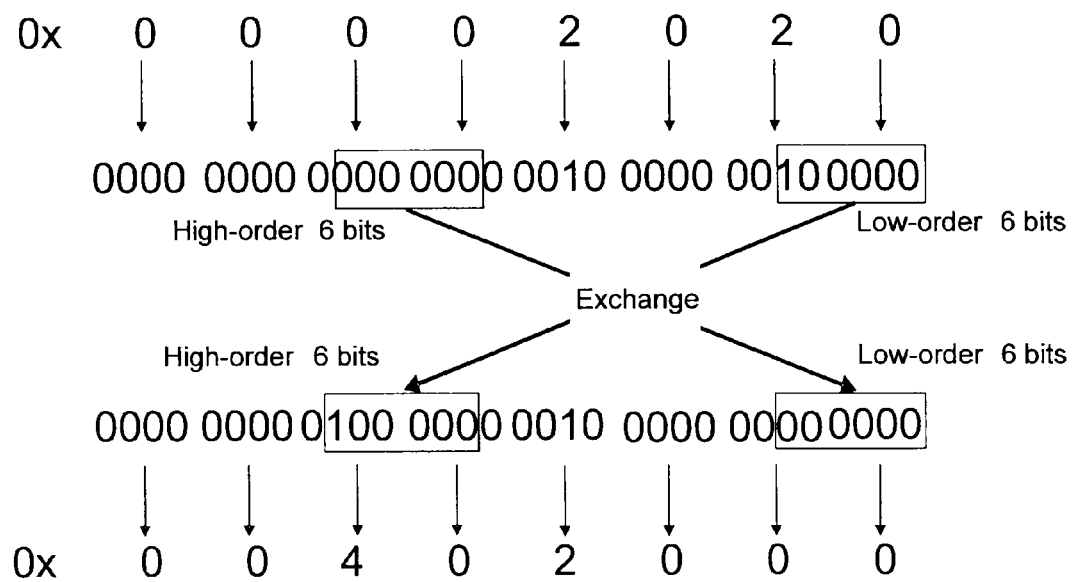
FIG. 7 is a schematic view showing an example of a comparison result table.
FIG. 8 is a schematic view showing an example of address conversion in a logical address generation unit.

FIG. 7 is a schematic diagram showing the comparison result to be stored in the comparison result storage unit 226. The comparison result storage unit 226 stores the comparison result as a comparison result table. The comparison result table shows the comparison result of all parts of the comparison address for each sector. The comparison result is indicated as "matching" if both address and data match and "mismatching" if not (one or both of address and data do not match). If the comparison result is "matching" in all parts of the comparison address, it is judged that the format has been detected. In other cases, it is judged that the format has not been detected.

(Details of Address Conversion)

Generation of address value (address conversion) by a logical address generation unit 221 is described in detail.

FIG. 8 shows an example of the address conversion in the logical address generation unit 221 according to the second embodiment. A logical address is generated by exchanging the high-order bit and the low-order bit of the address to be inputted. In this example, address "0x0000_2020" is inputted to the logical address generation unit 221. It is seen that "23" is stored in the address bit number storage unit 225, and "6" is stored in a logical address storage unit 222.

The value stored in the address bit number storage unit 225 indicates a range (the highest-order bit (the highest order of the high-order bit)) of the address bit to be exchanged. This example shows that the bits of the low-order 23 bit in the 32 bit address are exchanged.

The value to be stored in the logical address storage unit 222 shows a bit number (bit number to be exchanged) of the high-order bit and the low-order bit similar to the first embodiment.

Here, the logical address generation unit 221 exchanges low-order 6 bits (0 to 5th bits) and high-order 6 bits (17th to 22nd bits) in 23 bits of address value "0x0000_2020" to be inputted to generate a logical address.

(Operation of Memory System 200)

A case that the host device 130 writes data into the user area 207 in the memory card 201 is described. A general flow of processing here is similar to that of the first embodiment and shown in FIG. 5. But, the operation is partly different from the first embodiment.

(1) Identification Processing of Memory Card 201 (Step S21)

Similar to the first embodiment, card identification processing is performed between the memory card 201 and the host device 130, and the memory card 201 falls in an accessible state. In this embodiment, the comparison result to be stored in the comparison result storage unit 226 is initialized. Namely, the comparison result is determined to be "mismatching" in the whole range of the comparison address.

(2) Transmission/Reception of Writing (Write) Command (Step S22)

The host device 130 sets an address in an argument of the write command and transmits to the memory card 201, and the memory card 201 receives the write command.

(3) Detection of Format of Memory Card 201 (Step S23)

A method of detecting a format of the memory card 201 is described. In this embodiment, the format is detected by detecting the rewrite of the whole FAT1 area 210 to the initial value.

Figure 9:
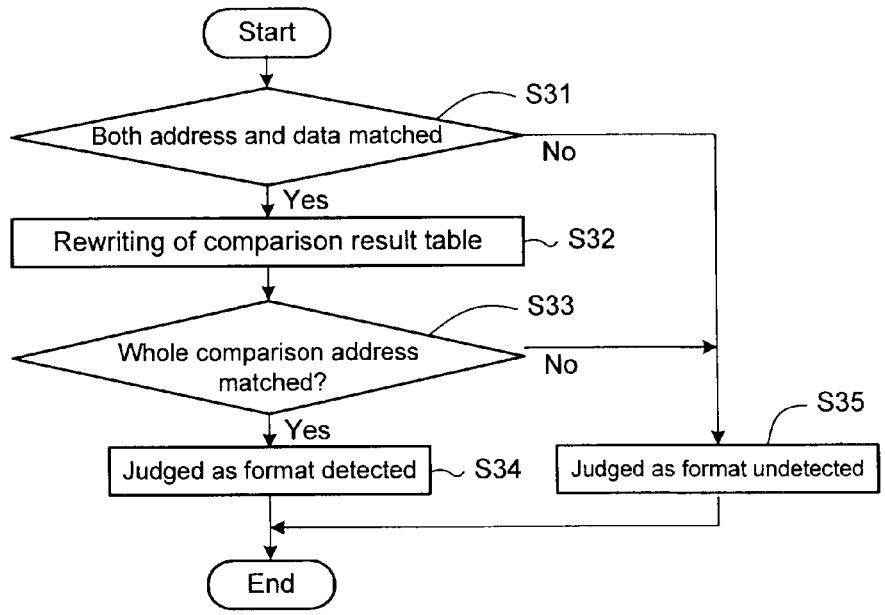
FIG. 9 is a flow chart showing an example of a procedure of detecting a format according to the second embodiment.

FIG. 9 is a flow chart showing an example of a procedure of detecting a format (step S23) in this embodiment.

1) Judgment of matching of address and data (step S31)

Address and data to be inputted (argument of write command) are compared with the address and data stored in the comparison address storage unit 223 and a comparison data storage unit 224. At this time, the matching of the address and data in sector unit is judged. Namely, when the address to be inputted overlaps a part of the address range of the comparison address storage unit 223, it is judged whether the overlapped range matches or mismatches for each sector.

2) Rewriting of comparison result table (step S32) If it is judged as "matching" in step S31, the comparison result table is rewritten to indicate "matching" for the compared address (sector).

3) Judgment of Matching of the Whole Comparison Address (Step S33)

In a case of the matching of the whole comparison address, namely "matching" of the comparison result in the whole the comparison result table, it is judged as "format detected", and in other cases, it is judged as "format undetected".

In this embodiment, since the comparison address is provided with an increased range, a possibility that normal writing is misidentified as a format is lowered. For example, a case that the host device 130 erases a large capacity file and a case that quick formatting is performed can be discriminated more surely.

The comparison result table is used because it is considered that the memory card 201 is formatted by plural write commands. In this embodiment, when formatting is performed by plural times of writing (when transmission/reception of a write command is performed plural times in step S22), there is a possibility that a format cannot be detected by each writing. Detection of a format by plural times of writing is facilitated by storing the past comparison results.

For example, it is assumed that the FAT1 area 210 has an address value in a range of "0x0000_1881" to "0x0000_1C40". And, it is also assumed that the comparison data storage unit 224 has a capacity of 959.5 KB, and an initial value data sequence is stored. The initial value data sequence is assumed to be, for example, 959.5 KB as a whole, first 12 bytes are "0xF8, 0xFF, 0xFF, 0x0F, 0xFF, 0xFF, 0xFF, 0x0F, 0xFF, 0xFF, 0xFF and 0x0F", and all the following are "0".

Here, it is considered below that a write command is issued from the host device 130 to address "0x0000_1881" of the FAT1 area 210 to perform quick formatting. In this case, the inputted address value "0x0000_1881" is compared with addresses "0x0000_1881 to 0x0000_1C40" stored in the comparison address storage unit 223, and it is judged that the address values match (overlap). In addition, data at the overlapped address is compared with data stored in the comparison data storage unit 224, and it is judged that the data match. According to the judged result, the comparison result table is rewritten partly (overlapped addresses) as "matching". When the write command is issued plural times from the host device 130 and the entire FAT1 area 210 is rewritten (when the write command is issued to the address value "0x0000_1C40"), it is judged as "format detected".

(4) Alteration of Address Conversion Rules (Step S24)

When the format is detected, the address conversion rules are altered. Namely, the data stored in the logical address storage unit 222 is altered. For example, when the value stored in the logical address storage unit 222 is initial value "0", "1" is added to it, and value "1" is written.

(5) Movement of Data in Parts of User Area 107 (Step S25)

A controller 214 moves data having an address value smaller than the maximum address value stored in the comparison address storage unit 223 on the user area 107. Here, the FAT1 area 210 is mostly subject to the movement excepting the final sector of the FAT1 area 210. It is because writing to the FAT1 area 210 is mostly (excepting the last writing) based on the converted address according to the rules before alteration.

(6) Conversion of Write Address (Step S26)

When the format is not detected, the address is converted and written into the user area 207 according to the rules before alteration. For example, when the value to be stored in the logical address storage unit 222 is initial value "0", the address becomes same before and after the conversion as a result.

When the format is detected, the address is converted and written into the user area 207 according to the rules after alteration. For example, it is assumed that the value to be stored in the logical address storage unit 222 is altered from initial value "0" to "1". In such a case, data is written into the user area 207 of the logical address value generated by exchanging high-order 1 bit and low-order 1 bit of the address value. Then, when a read command or a write command is received from the host device 130, the bit number of the logical address is exchanged by 1 bit to access, and secrecy of data can be enhanced.

Figure 4:
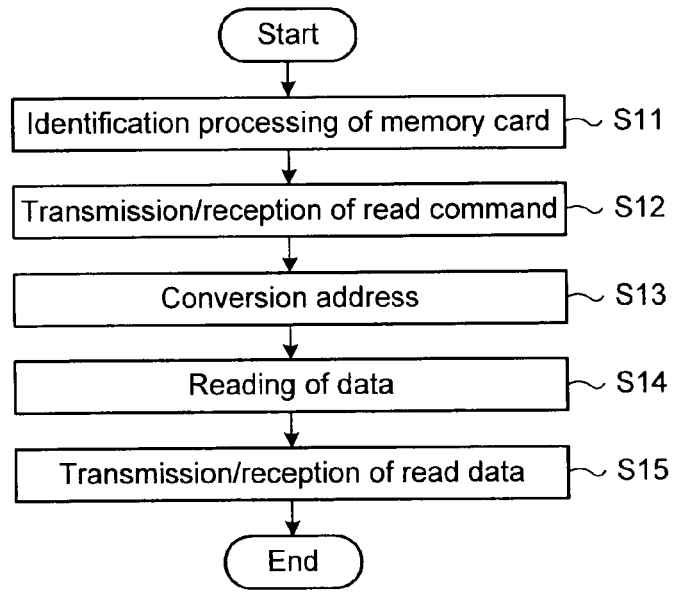
FIG. 4 is a flow chart showing an example of a procedure of reading data from a memory card.

A general flow of processing when the host device 130 reads data from the memory card 201 is similar to that in the first embodiment and expressed as shown in FIG. 4. Since the details of each processing content are substantially same as the case of writing data into the memory card 201, the detail description is omitted.

Third Embodiment

Figure 10:
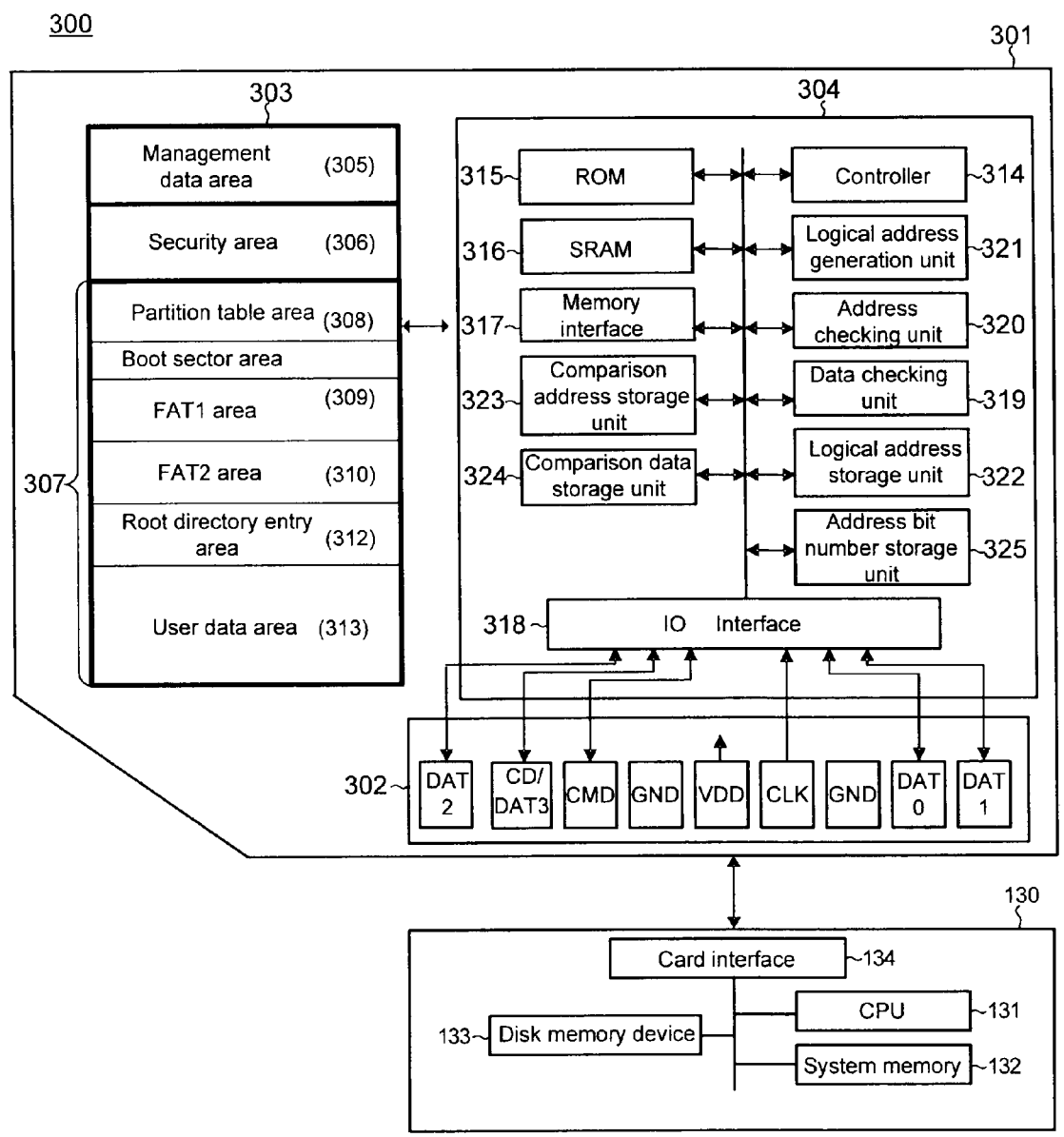
FIG. 10 is a block diagram showing a memory system according to a third embodiment.

FIG. 10 is a block diagram showing a memory system 300 according to a third embodiment. The memory system 300 has a memory card 301 and a host device 130. The memory card 301 has an interface signal terminal unit 302, a NAND memory 303, and a processor module 304.

The memory system 300 does not have a structure corresponding to the comparison result storage unit 226 of the memory system 200. On other points, the memory system 300 is substantially not different from the memory system 200.

(Operation of Memory System 300)

Figure 11:
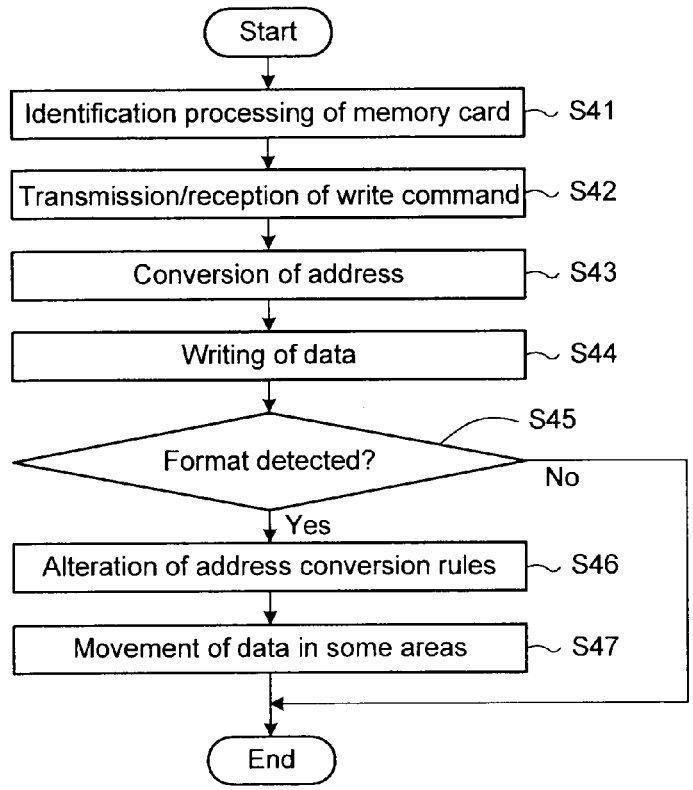
FIG. 11 is a flow chart showing an example of a procedure of writing data into a memory card.

Referring to the flow chart of FIG. 11, an operation procedure that the host device 130 writes data into a user area 307 in the memory card 301 is described.

(1) Identification Processing of the Memory Card 301, and Transmission/Reception of Writing (Write) Command (Steps S41, S42)

Steps S41, S42 correspond to steps S21, S22 of the second embodiment.

(2) Conversion of Write Address and Writing of Data into User Area 307 (Step S43, S44)

In this embodiment, data is written before the detection of a format. The address is converted and data is written according to the rules before conversion.

(3) Detection of Format of Memory Card 301 (Step S45)

When an operation to write into the NAND memory 303 is completed, it is judged whether a format has been detected. At this time, it is judged whether the entire comparison address range stored in a comparison address storage unit 323 has matched or mismatched. It is judged as "format detected" when data of the entire comparison address range matches. In other cases (when data of even a part of the address range does not match), it is judged as "format undetected". By comparing address and data after writing, it is possible to check the presence or not of matching of the entire comparison address range without using a structure corresponding to the comparison result storage unit 225.

Specifically, matching and mismatching of the entire comparison address range are judged as follows. Namely, a data checking unit 319 reads from the NAND memory 303 data corresponding to the address stored in the comparison address storage unit 323. An address checking unit 320 compares the data read from the NAND memory 303 with data stored in a comparison data storage unit 324, and judges whether or not they match.

Here, it is preferable that a busy signal is outputted from the memory card 301 to the host device 130 while the data is being compared to stop accessing the memory card 301. It is to prevent the user area 307 from being rewritten while matching of the entire comparison address range is being judged.

(4) Alteration of Address Conversion Rules (Step S46)

When a format is detected, the address conversion rules are altered. For example, "1" is added to the value stored in a logical address storage unit 322.

(5) Movement of Data in Parts of User Area 107 (Step S47)

On the user area 307, a controller 314 moves the address value stored in the comparison address storage unit 323 and data with an address value smaller than it to the converted address according to the altered rules. Here, a FAT1 area 310 as a whole is also subject to movement. It is because the initial value is written into the FAT1 area 310 based on the address converted according to the rules before alteration.

Use of the above-described format detection (S45) allows to distinguish between a case that the host device 130 has erased a large capacity file and a case that quick format has been performed. Namely, it becomes possible to alter the address rules only when quick formatting is performed. For example, the comparison address range is determined to be the entire FAT1 area 310, and it is considered that the host device 130 has erased from the minimum address of the FAT1 area 310 to a half of the FAT1 area 310. In this case, since data of the latter half of the address of the FAT1 area 310 does not match data stored in the comparison data storage unit 324, it can be judged as not quick formatting.

Fourth Embodiment

Figure 12:
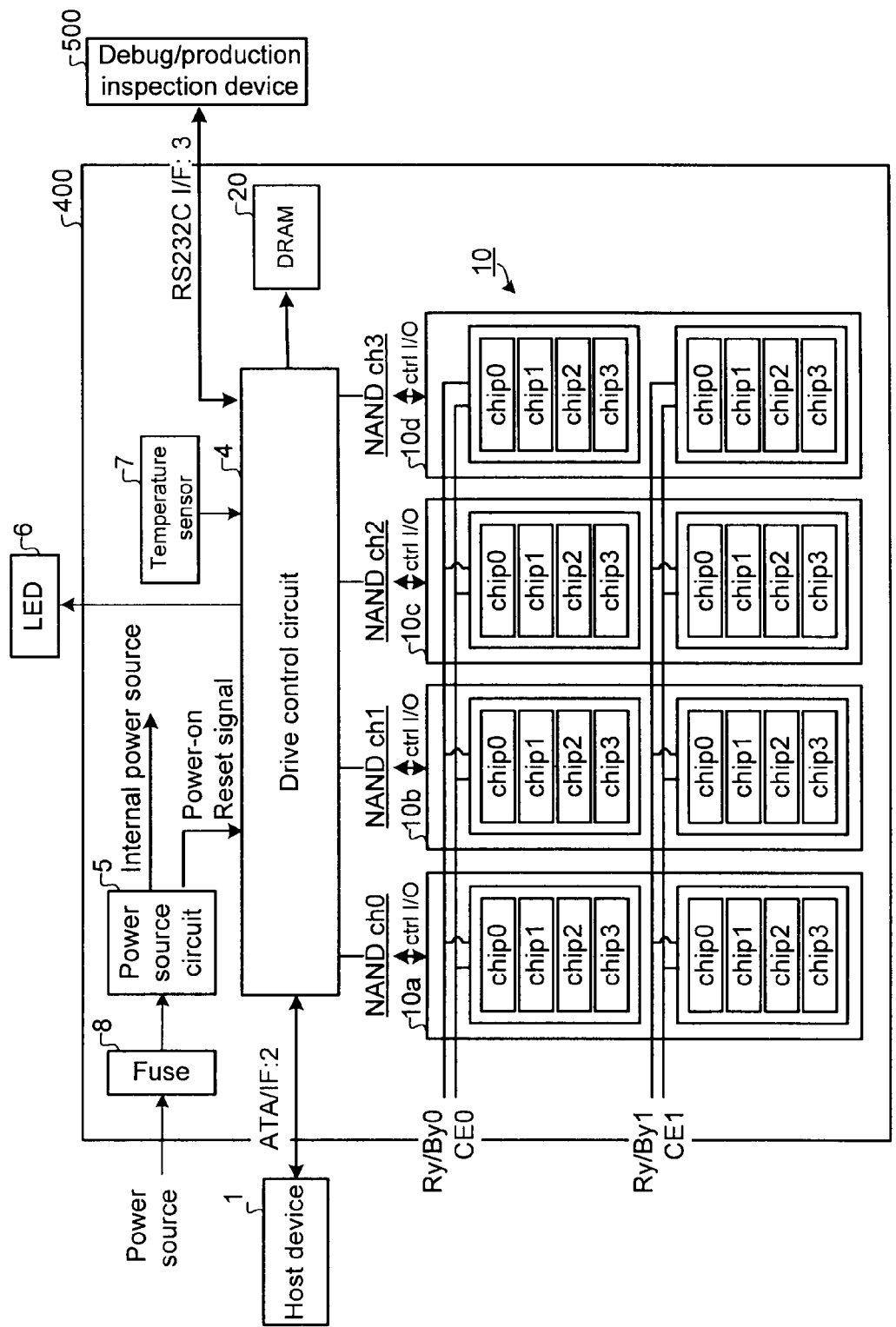
FIG. 12 is a block diagram showing a memory system according to a fourth embodiment.

FIG. 12 is a block diagram showing a memory system according to a fourth embodiment. This memory system has a host device 1, an SSD (Solid State Drive) 400, and a debug/production inspection device 500.

The host device 1 is, for example, a digital device such as a personal computer or a CPU core.

The SSD 400 is connected with the host device 1 via a memory connection interface such as an ATA interface (ATA I/F) 2, and functions as its external memory. The SSD 400 can perform transmission/reception of data to and from the debug/production inspection device 500 via a communication interface 3 such as an RS232C interface (RS232C I/F). The SSD 400 has a NAND type flash memory (hereinafter abbreviated as the NAND memory) 10 as a nonvolatile semiconductor memory, a drive control circuit 4 as a controller, a DRAM 20 as a volatile semiconductor memory, a power source circuit 5, a state display LED 6, a temperature sensor 7 for detecting a temperature within the drive, and a fuse 8.

Figure 13:
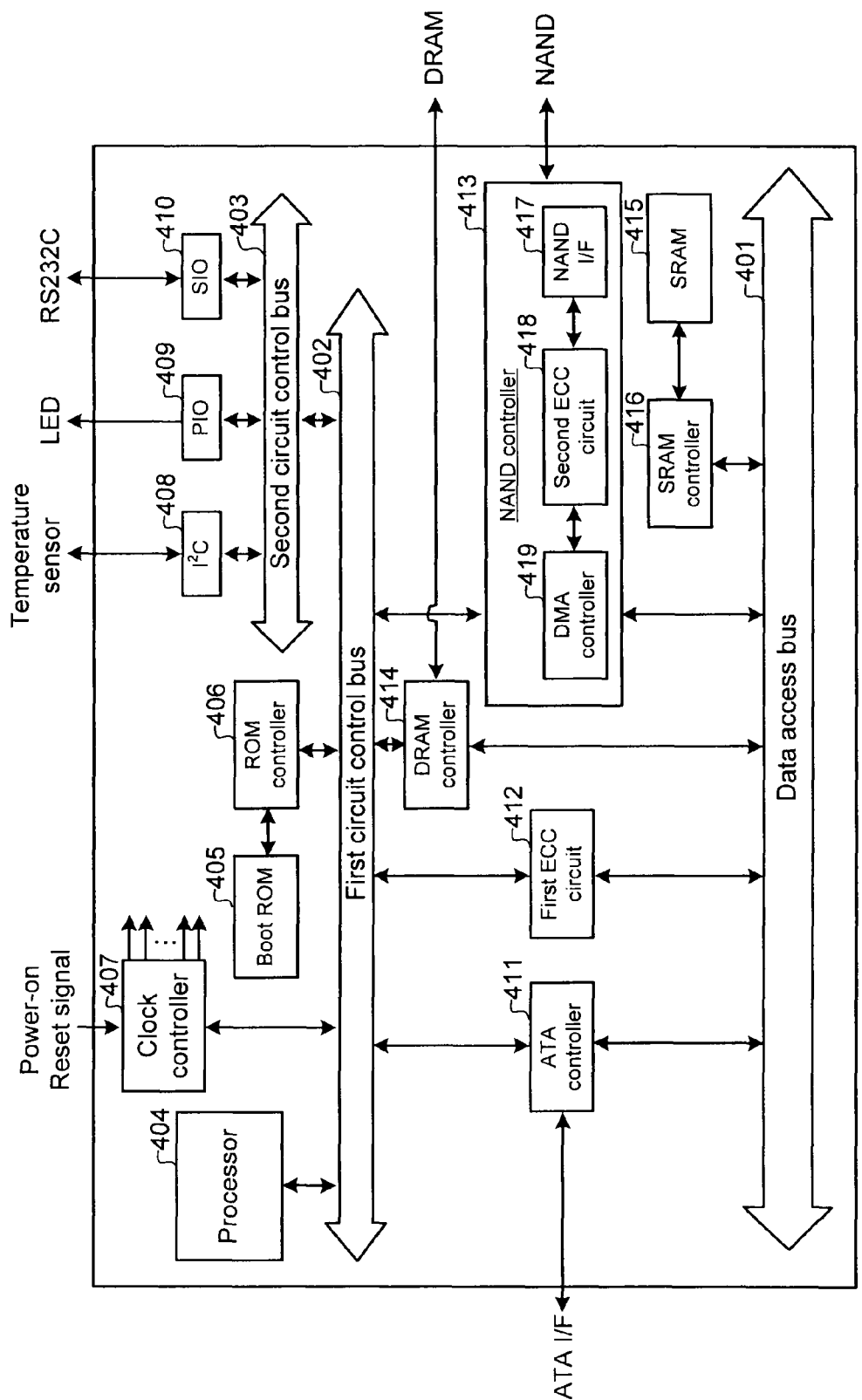
FIG. 13 is a block diagram showing an inner structure example of a drive control circuit.

FIG. 13 is a block diagram showing an example of a hardware inner structure of the drive control circuit 4. The drive control circuit 4 is provided with a data access bus 401, a first circuit control bus 402, and a second circuit control bus 403. The first circuit control bus 402 is connected with a processor 404 for controlling the entire drive control circuit 4. The first circuit control bus 402 is connected with a boot ROM 405 via a ROM controller 406. The boot ROM 405 stores a boot program for booting the respective management programs (FW: firmware) stored in the NAND memory 10. The first circuit control bus 402 is connected with a clock controller 407. The clock controller 407 receives a power-on reset signal from the power source circuit 5 shown in FIG. 12 and supplies a reset signal and a clock signal to the respective units.

Figure 14:
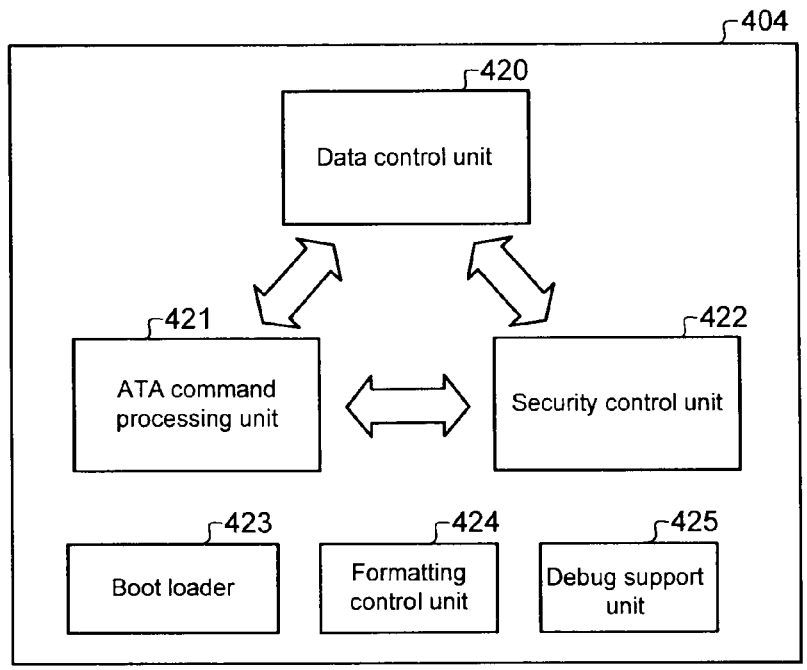
FIG. 14 is a block diagram showing a functional structure example of a processor.

FIG. 14 is a block diagram showing an example of a functional structure of firmware realized by the processor 404. The functions of the firmware realized by the processor 404 are roughly classified into a data control unit 420, an ATA command processing unit 421, a security control unit 422, a boot loader 423, a formatting control unit 424, and a debug support unit 425.

The data control unit 420 controls the data transfer between the NAND memory 10 and the DRAM 20, and the functions related to the NAND memory 10 via a NAND controller 413 and a first ECC circuit 412. The ATA command processing unit 421 cooperates with the data control unit 420 to transfer data between the DRAM 20 and the host device 1 via an ATA controller 411 and a DRAM controller 414. The security control unit 422 cooperates with the data control unit 420 and the ATA command processing unit 421 to manage various kinds of security information.

Figure 15:
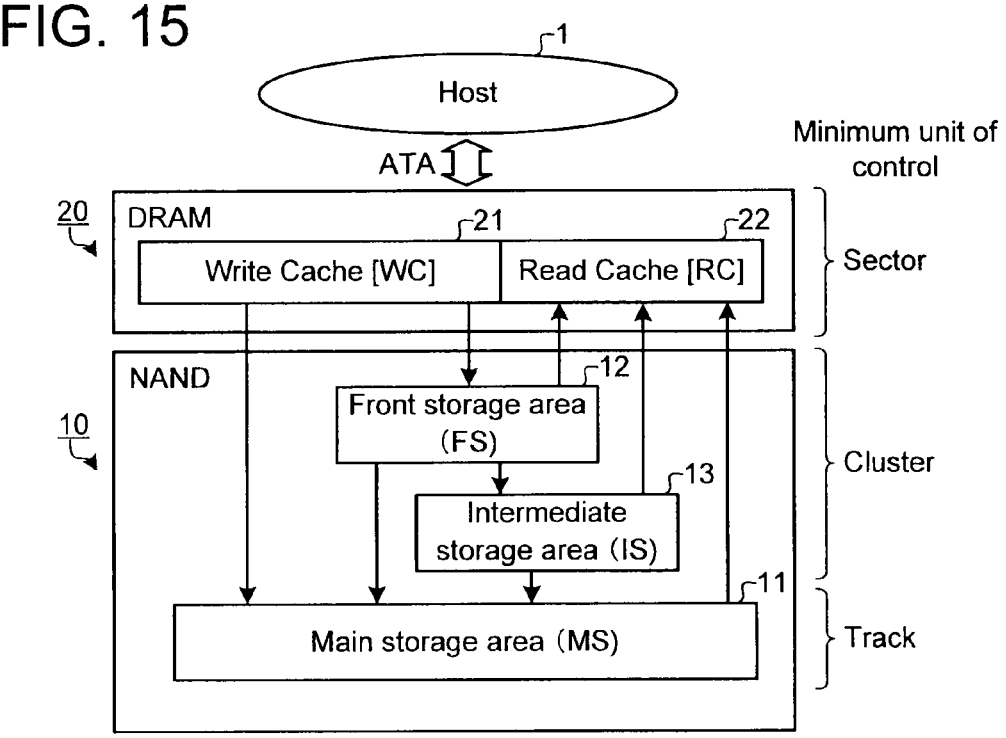
FIG. 15 is a block diagram showing function blocks within a NAND memory and DRAM.

FIG. 15 shows the NAND memory 10 and function blocks in the DRAM 20. A write cache (WC) 21 and a read cache (RC) 22 which are configured on the DRAM 20 are interposed between the host 1 and the NAND memory 10. The WC 21 temporarily stores Write data from the host device 1, and the RC 22 temporarily stores Read data from the NAND memory 10. The logical block in the NAND memory 10 is allotted to respective management areas such as a former storage area (FS: Front Storage) 12, a middle storage area (IS: Intermediate Storage) 13 and a main storage area (MS: Main Storage) 11 by the data control unit 420. It is intended to decrease an erasing amount of the NAND memory 10 when writing. The FS 12 manages the data from the WC 21 in a cluster unit which is a "small unit" and holds small data for a short period. The IS 13 manages data leaked from the FS 12 in a cluster unit which is a "small unit" and holds small data for a long period. The MS 11 holds data from the WC 21, the FS 12 and the IS 13 for a long period in a track unit which is a "large unit". These storage capacities are in order of, for example, MS>IS and FS>WC.

Figure 16:
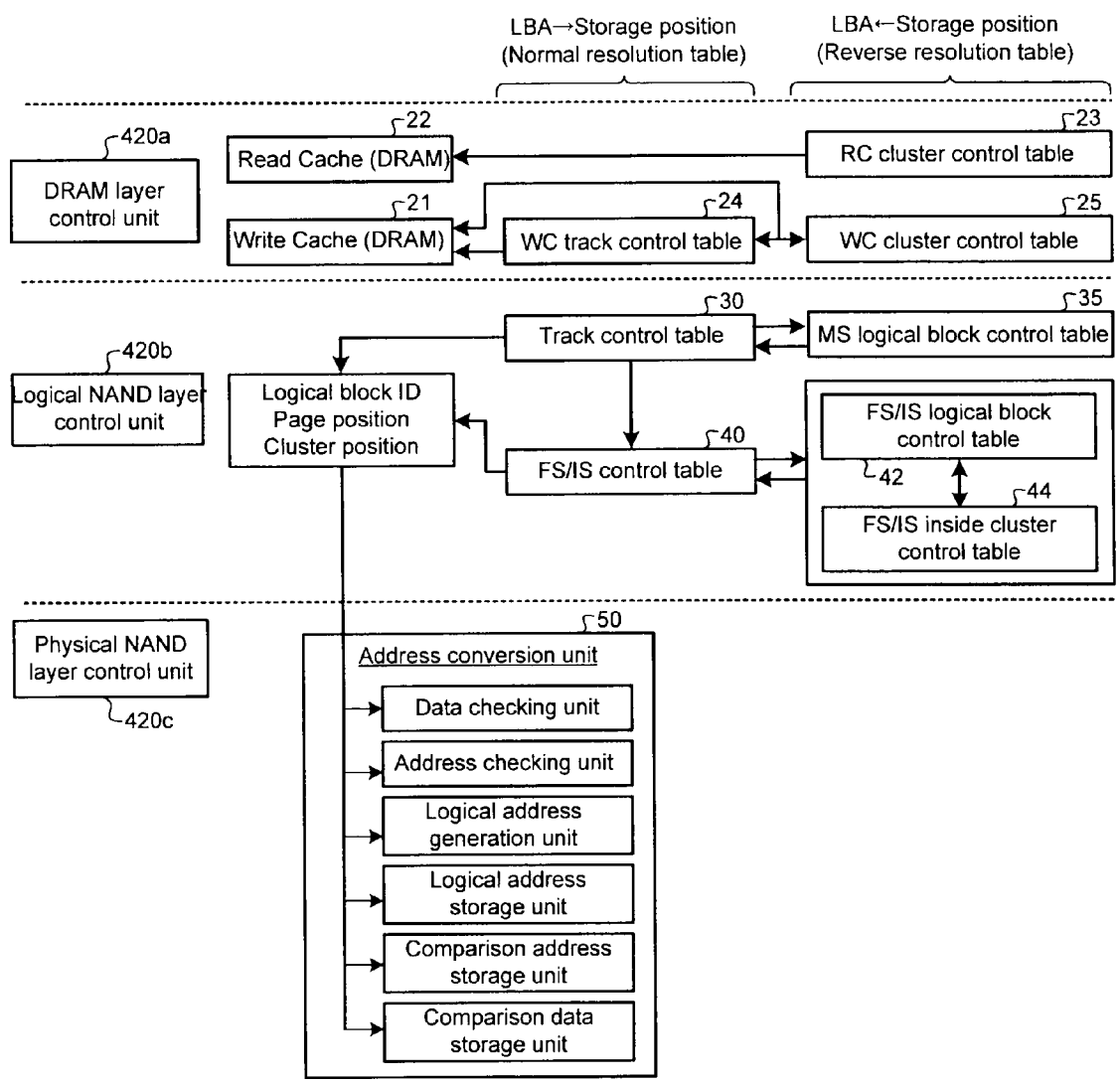
FIG. 16 is a schematic view showing control tables of a data control unit.

FIG. 16 shows control tables that the data control unit 420 performs control management of the individual component elements shown in FIG. 15. As described above, the data control unit 420 has a function to bridge between the ATA command processing unit 421 and the NAND memory 10 and is composed of a DRAM layer control unit 420a, a logical NAND layer control unit 420b and a physical NAND layer control unit 420c.

The DRAM layer control unit 420a manages the data stored in the DRAM 20. An RC cluster control table 23, a WC track control table 24 and a WC cluster control table 25 are controlled by the DRAM layer control unit 420a.

The logical NAND layer control unit 420b manages the data stored in the NAND memory 10. A track control table 30, an FS/IS control table 40, an MS logical block control table 35, an FS/IS logical block control table 42 and an FS/IS inside cluster control table 44 are managed by the logical NAND layer control unit 420b.

The physical NAND layer control unit 420c manages the NAND memory 10 as a physical storage device. An address conversion unit 50 is managed by the physical NAND layer control unit 420c.

Logical addresses of the FS 12, the IS 13 and the MS 11 in the NAND memory 10 are managed by the track control table 30, the FS/IS control table 40, the MS logical block control table 35, the FS/IS logical block control table 42 and the FS/IS inside cluster control table 44.

The track control table 30 is a table for management of logical data positions on the MS in a logical track address unit. In a case where data is held by the FS or the IS in a cluster unit, the track control table 30 holds basic information on them and pointers for detail information. The track control table 30 corresponds to the FAT of the memory card.

The individual control tables are stored in the areas on the NAND memory 10. At the time of initialization of the SSD 400, the control table is read from the NAND memory 10 to the DRAM 20 and used.

The logical address and the physical address are converted by the address conversion unit 50. The address conversion unit 50 includes an address checking unit, a logical address generation unit, a logical address storage unit, a comparison address storage unit, and a comparison data storage unit. They correspond to the data checking unit 119, the address checking unit 120, the logical address generation unit 121, the logical address storage unit 122, the comparison address storage unit 123, and the comparison data storage unit 124 of the memory system 100 according to the first embodiment.

Here, when quick formatting is performed, only the logical data position on the MS 11 stored in the track control table 30 is erased, and the data (user data) stored in the MS 11 is not erased. Therefore, there is a possibility that the user data is extracted by a third party or the like.

In this embodiment, the address conversion rules in the address conversion unit 50 are different before and after the quick formatting similar to the first embodiment and the like. As a result, it becomes difficult to access the MS 11 before the quick formatting, and data leakage is prevented (improvement of secrecy of data).

Other Embodiment

The embodiments of the present invention are not limited to those described above and can be expanded or modified, and the expansions and altered embodiments may also be within the technical scope of the present invention.

(1) In the embodiments described above, the high-order bit and the low-order bit of the address value are exchanged based on the value stored in the logical address storage unit to generate the logical address. Instead, a logical address may be generated by storing particular address value "0x200" or the like into the logical address storage unit and calculating (for example, adding) the input address and its value.

(2) In the embodiments described above, the comparison address storage unit stores the head address of the FAT1 area or the address range (head address to final address) of the FAT1 area. Instead, another address, for example, another address of the FAT1 area or an address of the FAT2 area may be stored. The comparison address can be defined appropriately in the area to be formatted. And, plural address values and address ranges may be stored in the comparison address storage unit.

(3) The capacity and contents of data stored in the comparison data storage unit are not limited to the embodiment described above. Namely, values other than the "one sector" in the first embodiment and "959.5 KB" in the second embodiment can be adopted as a capacity of data to be stored. And, the contents of data other than those of the embodiments may be adopted.

(4) In the embodiments described above, the comparison data is stored in the comparison data storage unit. Instead, the comparison data may be stored in a special area arranged within the NAND memory.

(5) In this embodiment, the address of the NAND memory is determined to be 32 bits. Other bit numbers can be used for the address.

What is claimed is:

1. A semiconductor memory device, comprising:
   an input unit inputting an address and data;
   a storage unit storing the data and a FAT (file allocation table);
   an address conversion unit converting the address into a converted address;
   an access unit accessing the storage unit according to the converted address;

a detection unit detecting a format of the FAT; and
an alteration unit altering conversion rules in the address conversion unit according to the detection.

2. The semiconductor memory device according to claim 1, wherein the address conversion unit converts the address by exchanging first and second bit sequences of a prescribed bit number in a bit sequence indicating the address inputted to the input unit.

3. The semiconductor memory device according to claim 2, wherein the alteration unit alters conversion rules by altering the prescribed bit number.

4. The semiconductor memory device according to claim 3, wherein the alteration unit alters conversion rules by adding one to the prescribed bit number.

5. The semiconductor memory device according to claim 2, wherein:
the first bit sequence is a range from the lowest-order bit of a bit sequence indicating the address to the prescribed bit number; and
the second bit sequence is a range from the highest-order bit of a bit sequence indicating the address to the prescribed bit number.

6. The semiconductor memory device according to claim 2, wherein:
the input unit inputs a plurality of addresses and a plurality of data, and
the detection unit is provided with:
an address storage unit storing a prescribed plurality of addresses;
an address checking unit checking whether or not all the prescribed plurality of addresses match any of the inputted plurality of addresses;
a data storage unit storing a prescribed plurality of data;
a data checking unit checking whether or not all the prescribed plurality of data match a plurality of data with a matched address in the inputted plurality of data; and
a judging unit judging the presence or not of the format based on the match of the address and the data.

7. The semiconductor memory device according to claim 6, wherein the alteration unit alters conversion rules, when the judging unit judges the format is present.

8. The semiconductor memory device according to claim 6, wherein one is added to the prescribed bit number, when the judging unit judges the format is present.

9. The semiconductor memory device according to claim 1, wherein the address conversion unit converts the address by calculating a value of the inputted address and a prescribed value.

10. The semiconductor memory device according to claim 9, wherein the alteration unit alters conversion rules by altering the prescribed value.

11. An operation method of a semiconductor memory device including a storage unit storing data and a FAT (file allocation table), and an address conversion unit converting an address, the method comprising:
inputting the address and the data;
detecting the presence or not of a format of the FAT;
altering conversion rules in the address conversion unit according to the detection;
converting the address inputted by the address conversion unit; and
accessing the storage unit according to the converted address.

12. The operation method of a semiconductor memory device according to claim 11, wherein the address conversion unit converts the address by exchanging first and second bit sequences of a prescribed bit number in a bit sequence indicating the inputted address.

13. The operation method of a semiconductor memory device according to claim 12, wherein the conversion rules are altered by altering the prescribed bit number.

14. The operation method of a semiconductor memory device according to claim 13, wherein the alteration unit alters conversion rules by adding one to the prescribed bit number.

15. The operation method of a semiconductor memory device according to claim 12,
wherein:
the first bit sequence is a range from the lowest-order bit of a bit sequence indicating the address to the prescribed bit number; and
the second bit sequence is a range from the highest-order bit of a bit sequence indicating the address to the prescribed bit number.

16. The operation method of a semiconductor memory device according to claim 15, wherein the conversion rules are altered by altering the prescribed value.

17. The operation method of a semiconductor memory device according to claim 16, wherein the address conversion unit converts the address by calculating a value of the inputted address and a prescribed value.

18. The operation method of a semiconductor memory device according to claim 11,
wherein the detecting step comprises:
checking whether or not the inputted address matches a prescribed address;
checking whether or not the inputted data matches prescribed data; and
judging the presence or not of the format based on the match of the address and the data.

19. The operation method of a semiconductor memory device according to claim 11,
wherein, in the inputting step, a plurality of addresses and a plurality of data are inputted, and
the detecting step comprises:
checking whether or not all a prescribed plurality of addresses match any of the inputted plurality of addresses;
checking whether or not all a prescribed plurality of data match a plurality of data with a matched address in the inputted plurality of data; and
judging the presence or not of the format based on the match of the address and the data.

* * * * *